(12) United States Patent
Knickrehm

(10) Patent No.: US 6,418,658 B1
(45) Date of Patent: Jul. 16, 2002

(54) POLE-ATTACHED FISHING LINE CLEANING TOOL

(76) Inventor: Matthew Knickrehm, 345 W. Karcher Rd., Nampa, ID (US) 83687

( * ) Notice: Subject to any disclaimer, the term of this patent is extended or adjusted under 35 U.S.C. 154(b) by 0 days.

(21) Appl. No.: 09/579,831

(22) Filed: May 26, 2000

(51) Int. Cl.⁷ ............................................... A01K 97/00
(52) U.S. Cl. ......................................................... 43/25
(58) Field of Search .............................. 43/25; 118/234; 15/256.6

(56) References Cited

U.S. PATENT DOCUMENTS

| | | | | |
|---|---|---|---|---|
| 1,627,514 A | * | 5/1927 | Kraemer | 43/25 |
| 1,709,436 A | * | 4/1929 | Koester | 43/25 |
| 2,193,386 A | * | 3/1940 | Bashore | 43/25 |
| 2,233,311 A | * | 2/1941 | Harne | 43/25 |
| 2,301,243 A | * | 11/1942 | Binkley | 43/25 |
| 2,434,861 A | * | 1/1948 | Pachner | 43/25 |
| 2,464,880 A | * | 3/1949 | McCombs | 43/25 |
| 2,519,257 A | * | 8/1950 | Legner | 43/25 |
| 2,680,925 A | * | 6/1954 | Grunwald | 43/25 |
| 2,700,787 A | | 2/1955 | Trapanese | 15/256.6 |
| 2,713,228 A | * | 7/1955 | Grunwald | 43/25 |
| 2,715,291 A | * | 8/1955 | Sweigert | 43/25 |
| 2,791,858 A | * | 5/1957 | Kernodle | 43/25 |
| 2,804,711 A | * | 9/1957 | Kozar | 43/25 |
| 2,846,705 A | | 8/1958 | Marz | 15/134 |
| 3,545,119 A | * | 12/1970 | Murnan | 43/25 |
| 3,846,930 A | * | 11/1974 | Brown | 43/25 |
| 3,927,488 A | * | 12/1975 | Peddy | 43/25 |
| 4,237,641 A | | 12/1980 | Gupton | 43/25 |
| 4,501,222 A | | 2/1985 | Stone | 118/234 |
| 4,547,991 A | * | 10/1985 | Searcy | 43/18.1 |

\* cited by examiner

*Primary Examiner*—Kurt Rowan
(74) *Attorney, Agent, or Firm*—Pedersen & Co., PLLC; Ken J. Pedersen; Barbara S. Pedersen

(57) ABSTRACT

The present invention is a pole-attached fishing line cleaning and/or conditioning tool. Preferably, the tool is removably attached to a fishing pole with a convenient clamp or friction fit. The tool has a housing for receiving an absorbent and abrasive pad. Preferably, the housing opens like a book, and the pad is removable. Also, the housing has an aperture for receiving the fishing line. When the fishing line passes through the tool housing in its closed position, the line comes in firm contact with the pad, and with any cleaning and/or conditioning material absorbed in the pad.

6 Claims, 3 Drawing Sheets

POLE-ATTACHED FISHING LINE CLEANING TOOL

BACKGROUND OF THE INVENTION

1. Field of the Invention

This invention relates generally to fishing. More specifically, this invention relates to a pole-attached fishing line cleaning tool.

2. Related Art

Often, before or while fishing, the fishing person desires to clean and/or condition the fishing line. This is because the line becomes dirty with oils, scum and chemicals in the water. Also, the line becomes dirty by contact with the ground, boat decks and docks. For example, salt water may leave a gritty salt deposit on the fishing line, making the line corrosive and with a high friction coefficient. Then, unless the line is cleaned, it will resist movement through the fishing pole line guides or eyelets, resulting in shorter and less accurate casts.

Also, the fisherman may wish to further condition the fishing line, even after cleaning it. For example, waxes, U.V. resistant additives, softeners, lubricants, dust repellants, etc. may be put on the line to improve its performance and durability.

These cleaning/conditioning operations have been done in several ways. Typically, while at home, the fisherman removes the reel from the rod, and removes the fishing line completely from the reel, cleaning the line in its removed condition. The device used for this operation may be a separate reel for spooling the line off the reel which was on the pole. As the line spools off the pole reel, it is run through a cleaning station which includes an absorbent, abrasive pad containing a cleaner and/or conditioner material.

Also, Umpqua Feather Merchants and Loon Outdoors companies offer hand-held cleaning/conditioning pads for cleaning fishing lines. With these devices, the fishing line need not be completely removed from the reel in order to be cleaned. Instead, the line is spooled off the reel which is on the pole, and pulled through a cleaning/conditioning pad held in the fisherman's hand. This operation, therefore, may be performed in the field. However, the line pulled through the cleaning pad must typically rest on the ground, making it likely that the line will be dirtied. Therefore, this method has practical drawbacks, and is not often practiced in the field.

So, there remains a need for a simple and effective fishing line cleaner/conditioner apparatus which may be conveniently and effectively used in the field. This invention addresses that need.

SUMMARY OF THE INVENTION

The present invention is a pole-attached fishing line cleaning and/or conditioning tool. Preferably, the tool is removably attached to a fishing pole with a convenient clamp or other friction fit means. The tool has a housing for receiving an absorbent and abrasive pad. Preferably the housing is a split housing, with a hinge near one side, and opens like a book. Preferably the pad is removable, and a plurality of pads, including pads of differing absorbency an/or abrasiveness, may be used. Also, the housing has an aperture for receiving the fishing line. When the fishing line passes through the aperture in the tool housing in its closed position, the line comes in firm contact with the pad, and with any cleaning and/or conditioning material absorbed in the pad. This way, the fishing line may be conveniently and effectively cleaned and/or conditioned in the field.

DESCRIPTION OF THE PREFERRED EMBODIMENTS

Figure 1:
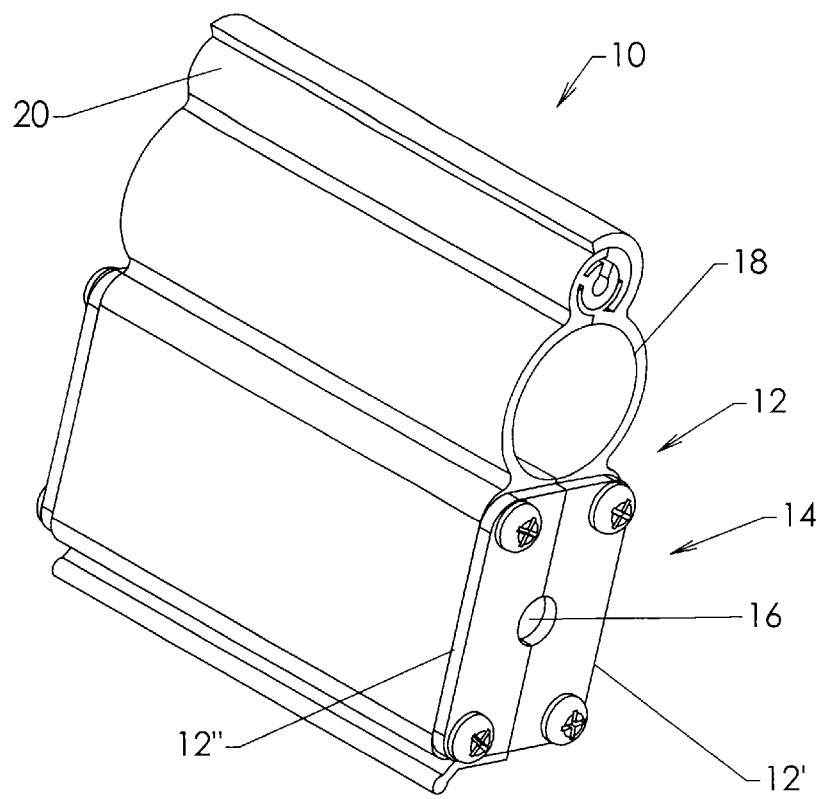
FIG. 1 is a top side, perspective view of one embodiment of the invention in a closed position.
Figure 2:
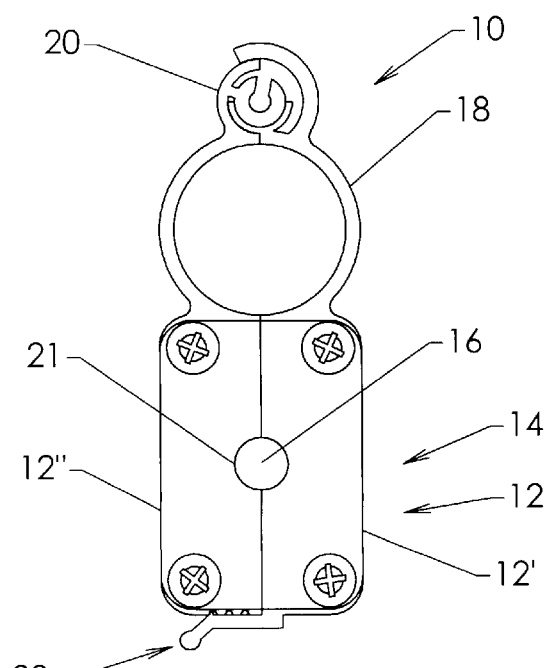
FIG. 2 is a front view of the embodiment as depicted in FIG. 1.
Figure 3:
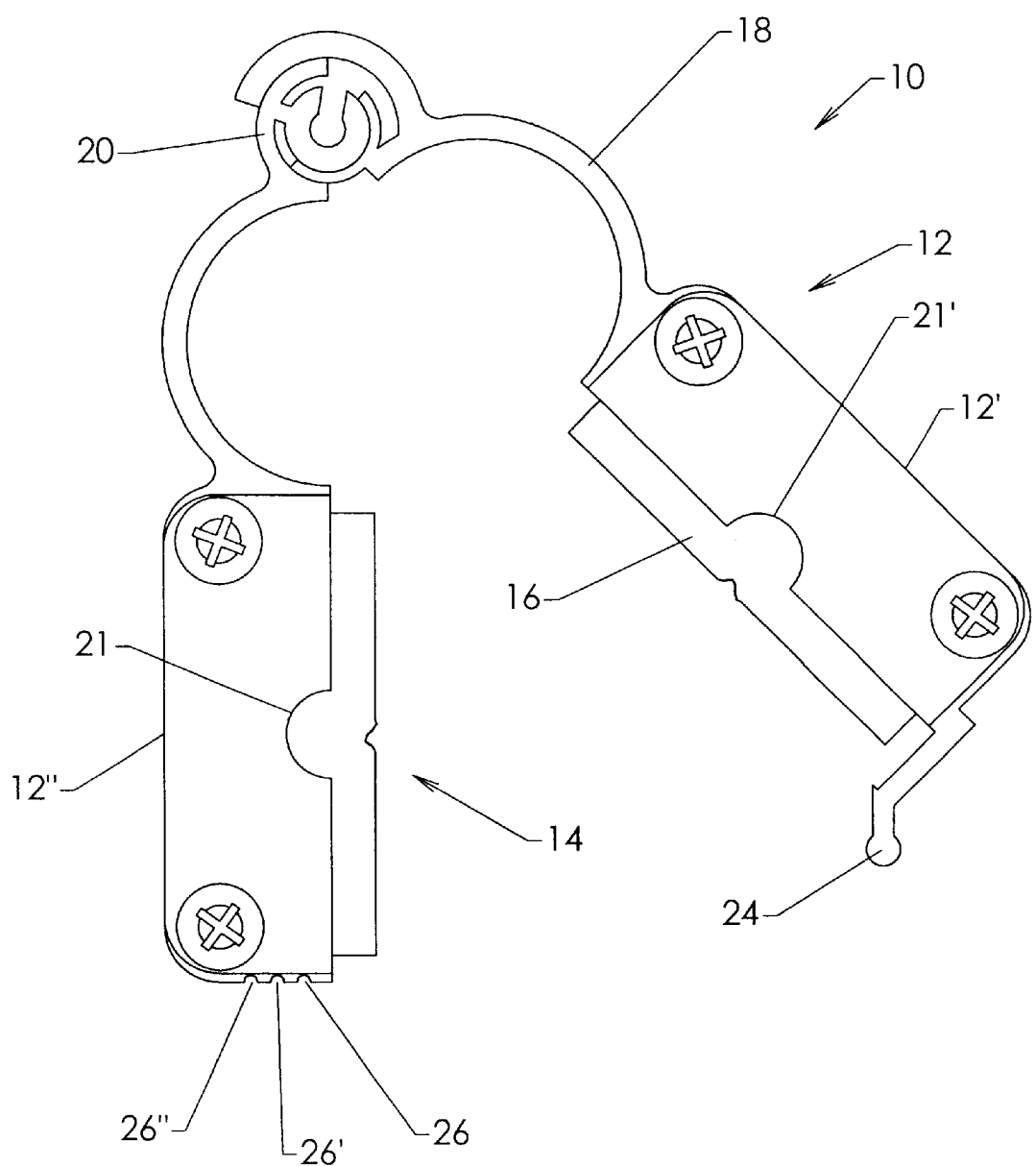
FIG. 3 is a front view of the embodiment depicted in FIG. 1, but in a partially open position.
Figure 4A:
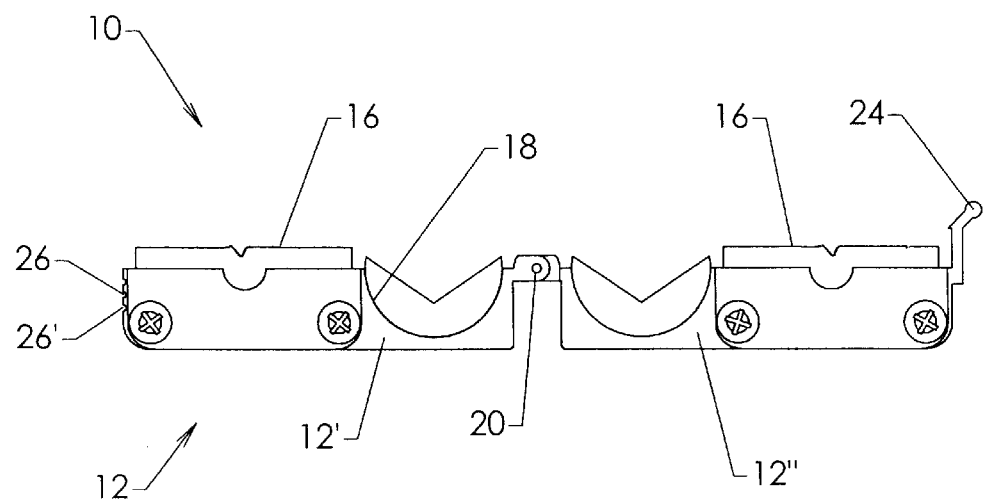
FIG. 4A is a front view of an alternate embodiment of the invention, but in a completely open position.
Figure 4B:
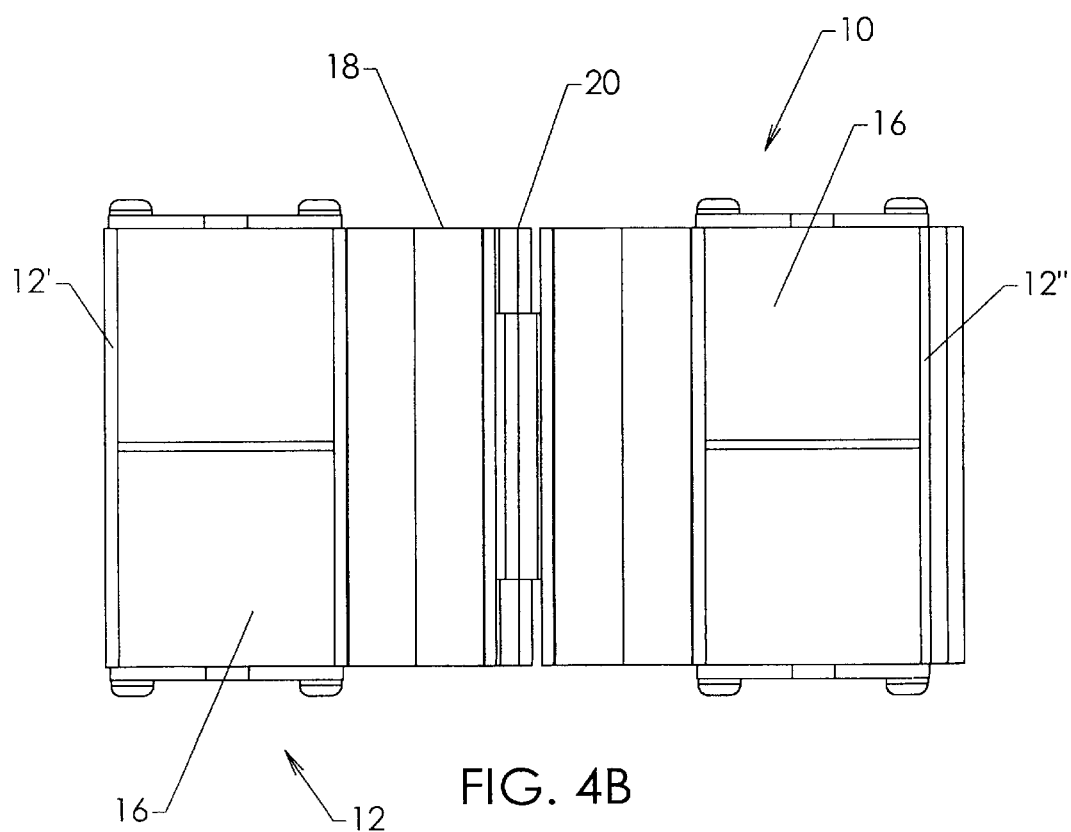
FIG. 4B is a top view of the alternate embodiment depicted in FIG. 4A.

Referring to the Figures, there is depicted one of many possible embodiments of the invented pole-attached fishing line cleaning tool 10. Tool 10 has a housing 12 defining an interior space 14. Inside space 14 is an absorbent and abrasive pad 16. Pad 16 is preferably filled with a liquid cleaning and/or conditioning material (not shown). Attached to a side edge of housing 12 is cylindrical sleeve 18. Sleeve 18 is adapted to receive and be secured around a fishing pole (not shown). Hinge 20 on the side of sleeve 18 opposite housing 12 permits the housing to open like a book when it is made of two separable housing portions 12' and 12". In the front and back faces of housing 12 are apertures 21 and 21'. The apertures permit the fishing line (not shown) to be cleaned or conditioned, to pass through the interior space 14, and come into contact therein with absorbent/abrasive pad 16.

When hinge 20 is open, two-part housing 12 is opened, and sleeve 18 is opened. This way, absorbent/abrasive pad 16 may be placed within, or taken out of, interior space 14. Preferably, at least one pad 16 is in housing portion 12', and at least one other pad 16 is in housing portion 12". Also, this way sleeve 18 may be placed around the fishing pole. When hinge 20 is closed, two-part housing 12 is closed, and sleeve 18 is closed. This way, absorbent/abrasive pad 16 is closed firmly around the fishing line (not shown) passing through apertures 21 and 21'.

On the edge of housing 12 opposite hinge 20 is an adjustable clamping latch 22. Latch 22 includes toothed lever 24 and cooperating longitudinal detents 26, 26' and 26". This way, the housing 12 may be adjustably closed and latched around pad 16 within inside space 14.

Regarding the line cleaning tool 10 of the invention, it is required that tool 10 be attachable to a fishing rod. Preferably, tool 10 is removably attachable to the pole. As in the preferred embodiment discussed above, one way to attach the tool to the rod is with an openable and closeable cylindrical clamp 18. However, other attachment means may be used. For example, a releasable band clamp may be connected to housing 12 in order to attach tool 10 to the rod. Also, housing 12 itself may be shaped so that part of it, like a partially open slightly conical frustum, may be releasably slipped onto the fishing pole. Then, another part of the housing may be adapted to receive the absorbent/abrasive pad 16 and the fishing line.

Housing 12 may be any convenient shape and size. Preferably, housing 12 is box-like, or rectangular. This way, pad 16 within interior space 14 may also be rectangular, a commercially convenient and economical shape. However, housing 12 may be of other shapes, including the conical frustum discussed above. The tool's 10's interior space 14 may also be any convenient shape and size. Preferably, when housing 12 is box-like, interior space 14 is also box-like, or rectangular. However, interior space 14 may be of other shapes. Preferably, the dimensions of interior space 14 are approximately 2½" long, 1½" high and ½" thick.

The absorbent/abrasive pad 16 may be of many different materials. Felt is a good, all-around material. Also, natural and synthetic sponge materials are also acceptable. Pad 16 may be present as a plurality of pads. In this case, depending upon the direction of travel of the fishing line through interior space 14, the plurality of pads may be of differing absorbency and/or abrasiveness in the direction of travel. For example, when cleaning the line, an abrasive, relatively non-absorbent pad or set of pads may be presented to the line first. This way, the dirt and grime are effectively stripped from the line. Further within interior space 14, where the line is cleaner, it may be presented with a different, relatively less abrasive, relatively more absorbent pad or set of pads. This way, the cleaned line may be effectively conditioned.

Clamp 18 may be of several different clamping or other friction fit styles. Besides openable cylindrical sleeve 18 and the releasable band clamp described above, the clamp may also be a tapered, partly open ring which slips around the rod and slides down towards the reel seat to become secured on the rod. Also, clamp 18 may include singular or plural belts or straps with fasteners like buttons, snaps, buckles, hook-and-loop fasteners, etc. for securing housing 12 to the fishing pole. In addition, compared to the "Λ" approach of the arrangment of hinge 20, cylindrical sleeve 18 and housing 12 discussed as the preferred embodiment above, the "X" approach may also be used. This way, hinge 20 is between cylindrical sleeve 18 and housing 12, so that the tool 10 opens and closes scissors-like in the "X" fashion, rather than clamshell-like in the "Λ" fashion.

By hinge 20, I mean any structure which permits the opening of housing 12 to receive pad 16, to clamp via sleeve 18 to the rod, and to receive the fishing line. For example, a set of latches on opposite sides of housing 12, which may eliminate the need for a literal hinge as discussed above, still, in combination, would be considered to be a hinge 20 according to the present invention because they permit the opening of housing 12. Also, this described set of latches, combined with a recess or indent in or near the housing 12 to enable it to be surrounded and secured to the rod, would be considered to be a clamp 18 according to the present invention.

Aperture 21 may be any hole or orifice which permits the fishing line to be cleaned or conditioned to pass through housing 12 and its interior space 14. Preferably, there are two (2) apertures 21 and 21", one on each end face of the housing 12. These apertures may be circular, oblong or rectangular slots. In fact, any shape will do, as long as it permits the fishing line to pass through housing 12 and into interior space 14.

Although this invention has been described above with reference to particular means, materials and embodiments, it is to be understood that the invention is not limited to these disclosed particulars, but extends instead to all equivalents within the scope of the following claims.

I claim:

1. A pole-attachable fishing line cleaning and/or conditioning tool, said tool having a length and comprising:
    a. a clamp for attaching the tool to a fishing rod, said clamp being an openable, cylindrical sleeve and extending substantially the length of said tool;
    b. a housing attached to said sleeve, wherein the housing is a split housing comprising two separable housing portions, said housing with an interior space for receiving an absorbent and/or abrasive pad within said interior space; and,
    c. an aperture within said housing for receiving a fishing line so that the line passes through said interior space of said housing and comes in contact with said absorbent and/or abrasive pad within said housing;
    a hinge connected to a side of said cylindrical sleeve and said housing connected to said cylindrical sleeve on an opposite side of said cylindrical sleeve so that when the hinge is opened, both the housing and the sleeve are opened, and when the hinge is closed, both the housing and the sleeve are closed.

2. The tool of claim 1 wherein there are a plurality of pads.

3. The tool of claim 2 wherein said plurality of pads include pads of differing absorbency.

4. The tool of claim 2 wherein said plurality of pads include pads of differing abrasiveness.

5. The tool of claim 1 which comprises a plurality of apertures.

6. The tool of claim 1 wherein said pad contains a cleaner and/or conditioner material.

* * * * *